United States Patent
Palmer et al.

(10) Patent No.: US 9,634,901 B2
(45) Date of Patent: Apr. 25, 2017

(54) TOPOLOGY DISCOVERY IN A COMPUTING SYSTEM

(71) Applicant: KnuEdge Incorporated, San Diego, CA (US)

(72) Inventors: Douglas A. Palmer, San Diego, CA (US); Doug B. Meyer, San Diego, CA (US); Jerome V. Coffin, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

(21) Appl. No.: 14/608,670

(22) Filed: Jan. 29, 2015

(65) Prior Publication Data

US 2016/0226712 A1    Aug. 4, 2016

(51) Int. Cl.
*H04L 12/24*    (2006.01)
*H04L 12/751*    (2013.01)

(52) U.S. Cl.
CPC .............. *H04L 41/12* (2013.01); *H04L 41/22* (2013.01); *H04L 45/02* (2013.01)

(58) Field of Classification Search
CPC .................................. H04L 41/12; H04L 41/22
See application file for complete search history.

(56) References Cited

U.S. PATENT DOCUMENTS

| | | | | |
|---|---|---|---|---|
| 7,054,544 B1* | 5/2006 | Tanaka | ................. | H04N 9/8063 348/512 |
| 2006/0221865 A1* | 10/2006 | Hawbaker | ............... | H04L 45/02 370/255 |
| 2015/0071292 A1* | 3/2015 | Tripathi | ................. | H04L 45/66 370/392 |

OTHER PUBLICATIONS

Author Unknown, OSPF Version 2, IETF RFC 2328, Apr. 1998, pp. 1-244.*
Z Kou, F. Yang and L. Feng, Update to OSPF Hello procedure, IETF document draft-kou-ospf-immediately-replying-hello-00, Dec. 2005, pp. 1-15.*

* cited by examiner

*Primary Examiner* — Christopher Crutchfield
(74) *Attorney, Agent, or Firm* — Fish & Richardson P.C.

(57) ABSTRACT

A computer network may comprise a plurality of computing devices. In one example, a method may be provided for discovering topology of the computer network. The method may comprise sending, by a host computing device of the computing network, a neighbor discovery packet to each network interface of the host that has a connection, receiving a reply packet responding to the neighbor discovery packet, building a neighbor map for all neighbor computing devices to the host, sending a connection discovery packet to each network interface of the host that has a connection, receiving reply packets responding to the connection discovery packet, and building a connection map for connections among computing devices based on the information in the reply packets.

20 Claims, 11 Drawing Sheets

TOPOLOGY DISCOVERY IN A COMPUTING SYSTEM

FIELD OF THE DISCLOSURE

The systems, methods and apparatuses described herein relate to a computing system having a plurality of multi-core processing devices and a topology discovery mechanism to discover the connections among the processing devices.

BACKGROUND

Conventional technology has used various complex and cumbersome methods to determine the topology of a network. For example, in one existing method, the discovery process requires pre-existing knowledge of nodes in the computing system. At a system start up, the network adapters must work in a "promiscuous" mode. In this mode, all packets that arrive at the network card are received, regardless of addressing. Then, the network adapters must switch to a normal mode for normal operation. In the normal mode, only packets addressed to a particular network card are received. The existing methods are complex, slow and may produce inaccurate results, and therefore there exists a need for a method of discovering network topology that is simple, fast, and accurate.

SUMMARY

The present disclosure provides systems, methods and apparatuses for topology discovery in a computer network. In one aspect of the disclosure, a method may be provided for discovering topology of the computer network. The method may comprise sending, by a host computing device of the computing network, a neighbor discovery packet to each network interface of the host that has a connection, receiving a neighbor discovery reply packet responding to the neighbor discovery packet, building a neighbor map for all neighbor computing devices to the host, sending a connection discovery packet to each network interface of the host that has a connection, receiving connection discovery reply packets responding to the connection discovery packet, and building a connection map for connections among computing devices based on the information in the connection discovery reply packets.

In another aspect of the disclosure, a computer network according to the present disclosure may comprise a host and a plurality of computing devices. The host may comprise a plurality of network interfaces to be coupled to other computing devices in the computer network and a processor. The processor may be configured to send a neighbor discovery packet to each network interface of the plurality of network interfaces that has a connection, receive a neighbor discovery reply packet to the neighbor discovery packet, build a neighbor map for all neighbor computing devices to the host, send a connection discovery packet to each network interface of the host that has a connection, receive connection discovery reply packets responding to the connection discovery packet, and build a connection map for connections among computing devices based on the information in the connection discovery reply packets.

In yet another aspect of the disclosure, a method may be provided for operating a computing device in a computer network that has a plurality of computing devices. The method may comprise receiving a first neighbor discovery packet sent by a neighbor, replying to the first neighbor discovery packet on the network interface on which the first neighbor discovery packet is received, sending a second neighbor discovery packet to each network interface of the computing device that has a connection other than the network interface on which the first neighbor discovery packet is received, receiving a neighbor discovery reply packet responding to the second neighbor discovery packet, building a neighbor map for all neighbor computing devices, receiving a connection discovery packet on a network interface, recording the network interface on which the connection discovery packet is received, sending a connection discovery reply packet to the connection discovery packet, forwarding the connection discovery packet, and forwarding connection discovery reply packet(s) responding to the connection discovery packet.

In yet another aspect, the present disclosure may provide a computing device for use a part of a computer network that has a plurality of computing devices. The computing device may comprise a plurality of network interfaces to be coupled to other computing devices in the computer network and a processor. The processor may be configured to receive a first neighbor discovery packet sent by a neighbor, reply to the first neighbor discovery packet on the network interface on which the first neighbor discovery packet is received, send a second neighbor discovery packet to each network interface of the computing device that has a connection other than the network interface on which the first neighbor discovery packet is received, receive a neighbor discovery reply packet responding to the second neighbor discovery packet, build a neighbor map including all neighbor computing devices, receive a connection discovery packet on a network interface, record the network interface on which the connection discovery packet is received, send a connection discovery reply packet responding to the connection discovery packet, forward the connection discovery packet, and forward connection discovery reply packet(s) responding to the connection discovery packet.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order to avoid unnecessarily obscuring the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1A:
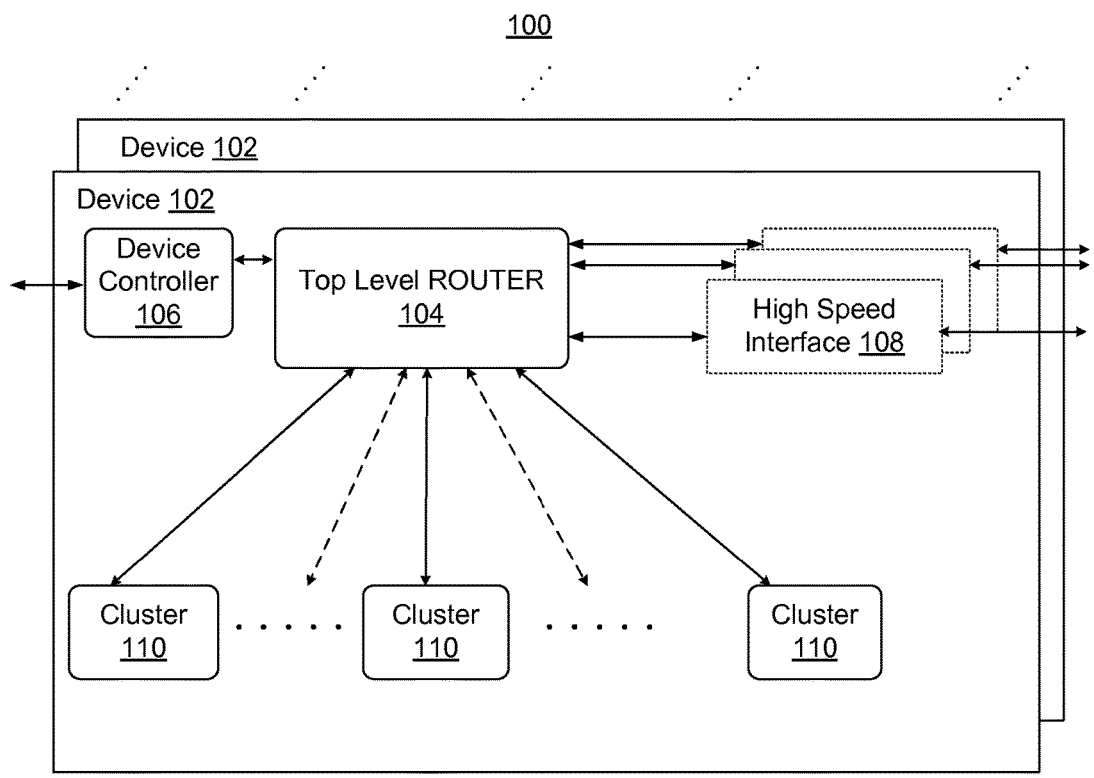
FIG. 1A is a block diagram of an exemplary computing system according to the present disclosure.

FIG. 1A shows an exemplary computing system 100 according to the present disclosure. The computing system 100 may comprise at least one processing device 102. A typical computing system 100, however, may comprise a plurality of processing devices 102. Each processing device 102, which may also be referred to as device 102, may comprise a router 104, a device controller 106, a plurality of high speed interfaces 108 and a plurality of clusters 110. The router 104 may also be referred to as a top level router or a level one router. Each cluster 110 may comprise a plurality of processing engines to provide computational capabilities for the computing system 100. The high speed interfaces 108 may comprise communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 may include 2, 4, 8, 16, 32 or another number of high speed interfaces 108. Each high speed interface 108 may implement a physical communication protocol. In one non-limiting example, each high speed interface 108 may implement the media access control (MAC) protocol, and thus may have a unique MAC address associated with it. The physical communication may be implemented in a known communication technology, for example, Gigabit Ethernet, or any other existing or future-developed communication technology. In one non-limiting example, each high speed interface 108 may implement bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair comprising one high speed interface 108 on one processing device 102 and another high speed interface 108 on the other processing device 102.

Figure 5:
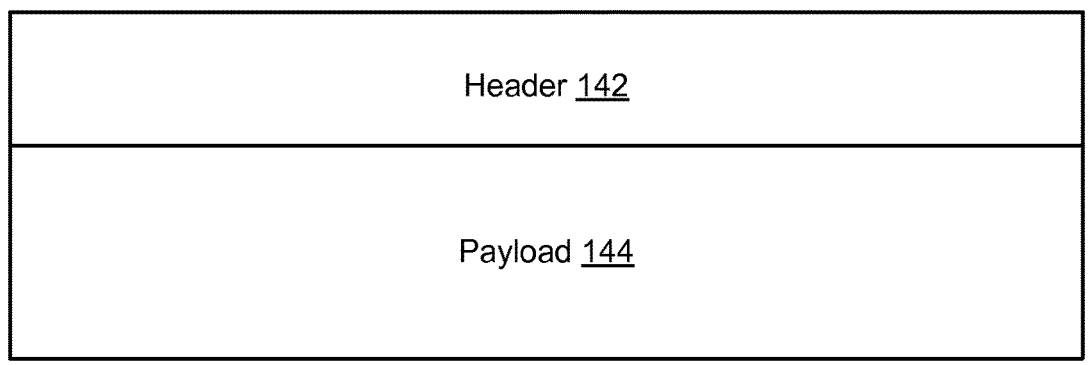
FIG. 5 is a block diagram of an exemplary packet according to the present disclosure.

Data communication between different computing resources of the computing system 100 may be implemented using routable packets. The computing resources may comprise device level resources such as a device controller 106, cluster level resources such as a cluster controller or cluster memory controller, and/or the processing engine level resources such as individual processing engines and/or individual processing engine memory controllers. An exemplary packet 140 according to the present disclosure is shown in FIG. 5. The packet 140 may comprise a header 142 and a payload 144. The header 142 may include a routable destination address for the packet 140. The router 104 may be a top-most router configured to route packets on each processing device 102. The router 104 may be a programmable router. That is, the routing information used by the router 104 may be programmed and updated. In one non-limiting embodiment, the router 104 may be implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

The device controller 106 may control the operation of the processing device 102 from power on through power down. The device controller 106 may comprise a device controller processor, one or more registers and a device controller memory space. The device controller processor may be any existing or future-developed microcontroller. In one embodiment, for example, an ARM® Cortex M0 microcontroller may be used for its small footprint and low power consumption. In another embodiment, a bigger and more powerful microcontroller may be chosen if needed. The one or more registers may include one to hold a device identifier (DEVID) for the processing device 102 after the processing device 102 is powered up. The DEVID may be used to uniquely identify the processing device 102 in the computing system 100. In one non-limiting embodiment, the DEVID may be loaded on system start from a non-volatile storage, for example, a non-volatile internal storage on the processing device 102 or a non-volatile external storage. The device controller memory space may include both read-only memory (ROM) and random access memory (RAM). In one non-limiting embodiment, the ROM may store bootloader code that during a system start may be executed to initialize the processing device 102 and load the remainder of the boot code through a bus from outside of the device controller 106. The instructions for the device controller processor, also referred to as the firmware, may reside in the RAM after they are loaded during the system start.

The registers and device controller memory space of the device controller 106 may be read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet may include a destination address such as DEVID:PADDR, of which the DEVID may identify the processing device 102 and the PADDR may be an address for a register of the device controller 106 or a memory location of the device controller memory space of a processing device 102. In some embodiments, a packet directed to the device controller 106 may have a packet operation code, which may be referred to as packet opcode or just opcode to indicate what operation needs to be performed for the packet. For example, the packet operation code may indicate reading from or writing to the storage location pointed to by PADDR. It should be noted that the device controller 106 may also send packets in addition to receiving them. The packets sent by the device controller 106 may be self-initiated or in response to a received packet (e.g., a read request). Self-initiated packets may include for example, reporting status information, requesting data, etc.

Figure 1B:
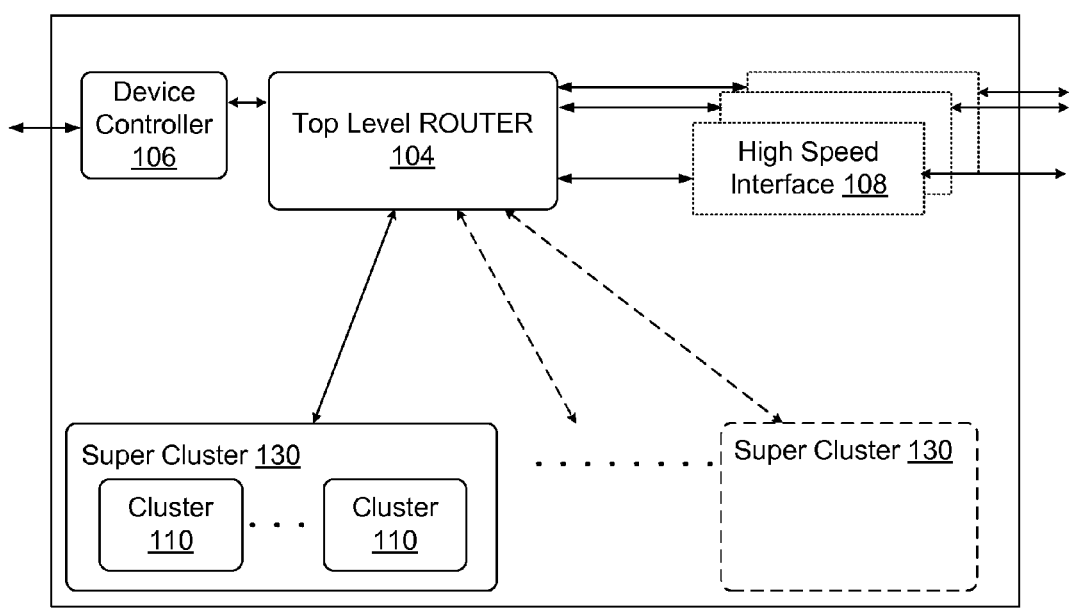
FIG. 1B is a block diagram of an exemplary processing device according to the present disclosure.

In one embodiment, a plurality of clusters 110 on a processing device 102 may be grouped together. FIG. 1B shows a block diagram of another exemplary processing device 102A according to the present disclosure. The exemplary processing device 102A is one particular embodiment of the processing device 102. Therefore, the processing device 102 referred to in the present disclosure may include any embodiments of the processing device 102, including the exemplary processing device 102A. As shown on FIG. 1B, a plurality of clusters 110 may be grouped together to form a super cluster 130 and an exemplary processing device 102A may comprise a plurality of such super clusters 130. In one embodiment, a processing device 102 may include 2, 4, 8, 16, 32 or another number of clusters 110, without further grouping the clusters 110 into super clusters. In another embodiment, a processing device 102 may include 2, 4, 8, 16, 32 or another number of super clusters 130 and each super cluster 130 may comprise a plurality of clusters.

Figure 2A:
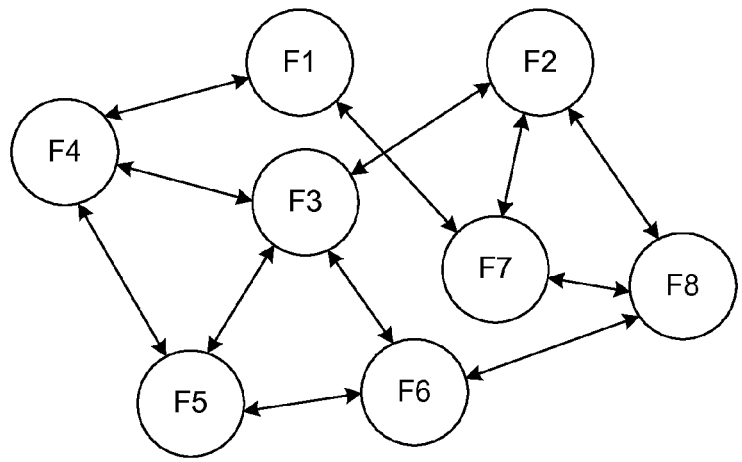
FIG. 2A is a block diagram of topology of connections of an exemplary computing system according to the present disclosure.

FIG. 2A shows a block diagram of an exemplary computing system 100A according to the present disclosure. The computing system 100A may be one exemplary embodiment of the computing system 100 of FIG. 1A. The computing system 100A may comprise a plurality of processing devices 102 designated as F1, F2, F3, F4, F5, F6, F7 and F8. As shown in FIG. 2A, each processing device 102 may be directly coupled to one or more other processing devices 102. For example, F4 may be directly coupled to F1, F3 and F5; and F7 may be directly coupled to F1, F2 and F8. Within computing system 100A, one of the processing devices 102 may function as a host for the whole computing system 100A. The host may have a unique device ID that every processing devices 102 in the computing system 100A recognizes as the host. For example, any processing devices 102 may be designated as the host for the computing system 100A. In one non-limiting example, F1 may be designated as the host and the device ID for F1 may be set as the unique device ID for the host.

In another embodiment, the host may be a computing device of a different type, such as a computer processor known in the art (for example, an ARM® Cortex or Intel® x86 processor) or any other existing or future-developed processors. In this embodiment, the host may communicate with the rest of the system 100A through a communication interface, which may represent itself to the rest of the system 100A as the host by having a device ID for the host.

The computing system 100A may implement any appropriate techniques to set the DEVIDs, including the unique DEVID for the host, to the respective processing devices 102 of the computing system 100A. In one exemplary embodiment, the DEVIDs may be stored in the ROM of the respective device controller 106 for each processing devices 102 and loaded into a register for the device controller 106 at power up. In another embodiment, the DEVIDs may be loaded from an external storage. In such an embodiment, the assignments of DEVIDs may be performed offline, and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change may be controlled by the host of the computing system 100A. For example, after the initialization of the computing system 100A, which may load the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
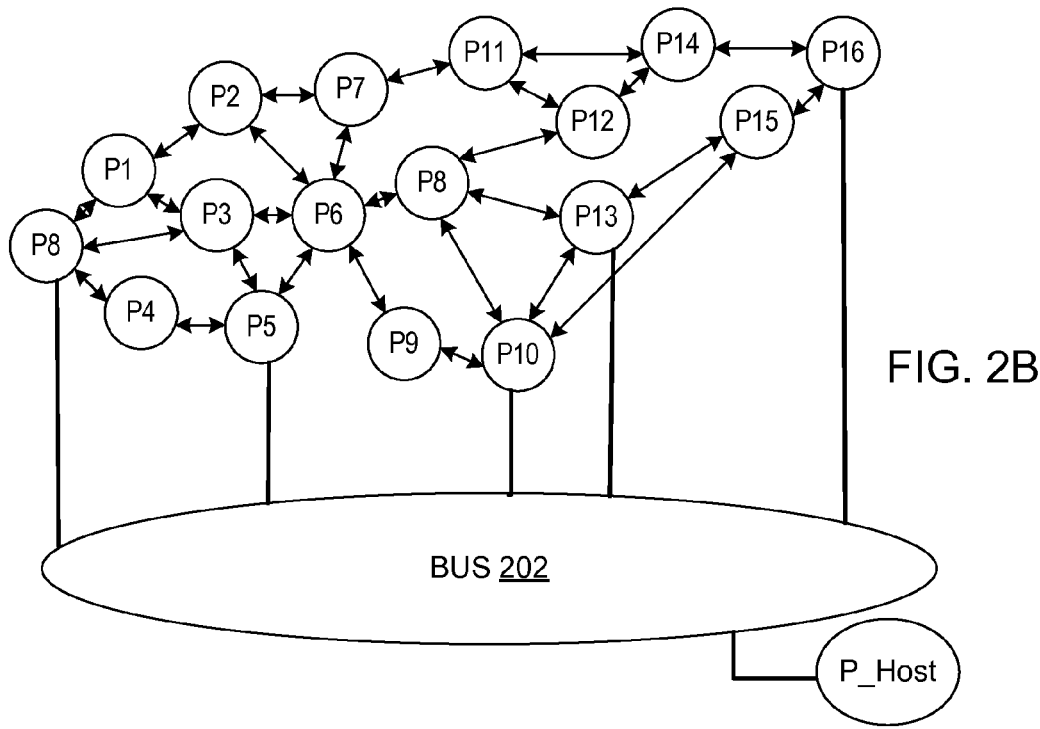
FIG. 2B is a block diagram of topology of connections of another exemplary computing system according to the present disclosure.

FIG. 2B is a block diagram of a topology of another exemplary system 100B according to the present disclosure. The computing system 100B may be another exemplary embodiment of the computing system 100 of FIG. 1 and may comprise a plurality of processing devices 102 (designated as P1 through P16 on FIG. 2B), a bus 202 and a processing device P_Host. Each processing device of P1 through P16 may be directly coupled to another processing device of P1 through P16 by a direct link between them. At least one of the processing devices P1 through P16 may be coupled to the bus 202. As shown in FIG. 2B, the processing devices P8, P5, P10, P13, P15 and P16 may be coupled to the bus 202. The processing device P_Host may be coupled to the bus 202 and may be designated as the host for the computing system 100B. In the exemplary system 100B, the host may be a computer processor known in the art (for example, an ARM® Cortex or Intel® x86 processor) or any other existing or future-developed processors. The host may communicate with the rest of the system 100B through a communication interface coupled to the bus and may represent itself to the rest of the system 100B as the host by having a device ID for the host.

Figure 3A:
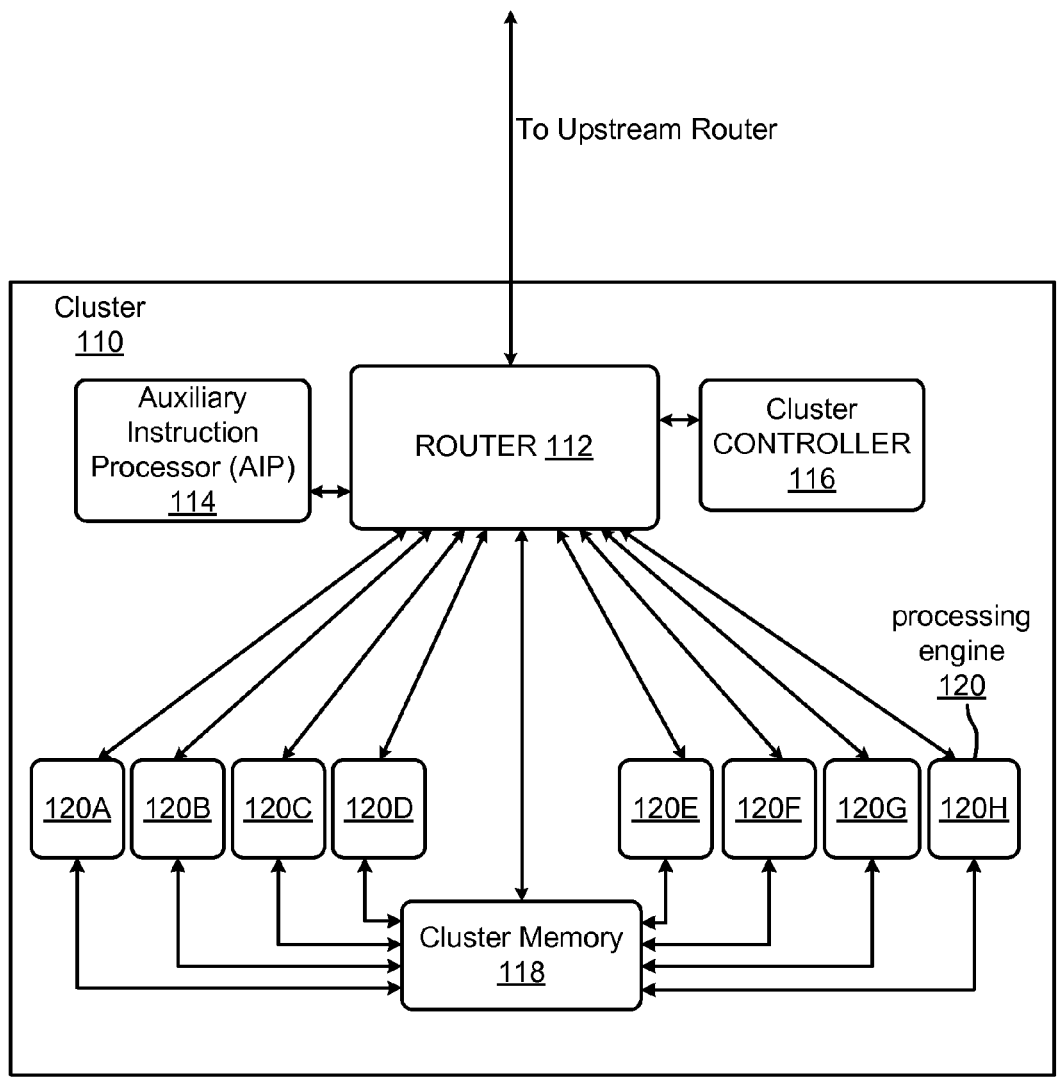
FIG. 3A is a block diagram of an exemplary cluster according to the present disclosure.

FIG. 3A shows a block diagram of an exemplary cluster 110 according to the present disclosure. The exemplary cluster 110 may comprise a router 112, a cluster controller 116, an auxiliary instruction processor (AIP) 114, a cluster memory 118 and a plurality of processing engines 120. The router 112 may be coupled to an upstream router to provide interconnection between the upstream router and the cluster 110. The upstream router may be, for example, the router 104 of the processing device 102 if the cluster 110 is not part of a super cluster 130.

The exemplary operations to be performed by the router 112 may include receiving a packet destined for a resource within the cluster 110 from outside the cluster 110 and/or transmitting a packet originating within the cluster 110 destined for a resource inside or outside the cluster 110. A resource within the cluster 110 may be, for example, the cluster memory 118 or any of the processing engines 120 within the cluster 110. A resource outside the cluster 110 may be, for example, a resource in another cluster 110 of the computer device 102, the device controller 106 of the processing device 102, or a resource on another processing device 102. In some embodiments, the router 112 may also transmit a packet to the router 104 even if the packet may target a resource within itself. In one embodiment, the router 104 may implement a loopback path to send the packet back to the originating cluster 110 if the destination resource is within the cluster 110.

The cluster controller 116 may send packets, for example, as a response to a read request, or as unsolicited data sent by hardware for error or status report. The cluster controller 116 may also receive packets, for example, packets with opcodes to read or write data. In one embodiment, the cluster controller 116 may be any existing or future-developed microcontroller, for example, one of the ARM® Cortex-M microcontroller and may comprise one or more cluster control registers (CCRs) that provide configuration and control of the cluster 110. In another embodiment, instead of using a microcontroller, the cluster controller 116 may be custom made to implement any functionalities for handling packets and controlling operation of the router 112. In such an embodiment, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

Each cluster memory 118 may be part of the overall addressable memory of the computing system 100. That is, the addressable memory of the computing system 100 may include the cluster memories 118 of all clusters of all devices 102 of the computing system 100. The cluster memory 118 may be a part of the main memory shared by the computing system 100. In some embodiments, any memory location within the cluster memory 118 may be addressed by any processing engine within the computing system 100 by a physical address. The physical address may be a combination of the DEVID, a cluster identifier (CLSID) and a physical address location (PADDR) within the cluster memory 118, which may be formed as a string of bits, such as, for example, DEVID:CLSID:PADDR. The DEVID may be associated with the device controller 106 as described above and the CLSID may be a unique identifier to uniquely identify the cluster 110 within the local processing device 102. It should be noted that in at least some embodiments, each register of the cluster controller 116 may also be assigned a physical address (PADDR). Therefore, the physical address DEVID:CLSID:PADDR may also be used to address a register of the cluster controller 116, in which PADDR may be an address assigned to the register of the cluster controller 116.

In some other embodiments, any memory location within the cluster memory 118 may be addressed by any processing engine within the computing system 100 by a virtual address. The virtual address may be a combination of a DEVID, a CLSID and a virtual address location (ADDR), which may be formed as a string of bits, such as, for example, DEVID:CLSID:ADDR. The DEVID and CLSID in the virtual address may be the same as in the physical addresses.

In one embodiment, the width of ADDR may be specified by system configuration. For example, the width of ADDR may be loaded into a storage location convenient to the cluster memory 118 during system start and/or changed from time to time when the computing system 100 performs a system configuration. To convert the virtual address to a physical address, the value of ADDR may be added to a base physical address value (BASE). The BASE may also be specified by system configuration as the width of ADDR and stored in a location convenient to a memory controller of the cluster memory 118. In one example, the width of ADDR may be stored in a first register and the BASE may be stored in a second register in the memory controller. Thus, the virtual address DEVID:CLSID:ADDR may be converted to a physical address as DEVID:CLSID:ADDR+BASE. Note that the result of ADDR+BASE has the same width as the longer of the two.

The address in the computing system 100 may be 8 bits, 16 bits, 32 bits, 64 bits, or any other number of bits wide. In one non-limiting example, the address may be 32 bits wide. The DEVID may be 10, 15, 20, 25 or any other number of bits wide. The width of the DEVID may be chosen based on the size of the computing system 100, for example, how many processing devices 102 the computing system 100 has or may be designed to have. In one non-limiting example, the DEVID may be 20 bits wide and the computing system 100 using this width of DEVID may contain up to $2^{20}$ processing devices 102. The width of the CLSID may be chosen based on how many clusters 110 the processing device 102 may be designed to have. For example, the CLSID may be 3, 4, 5, 6, 7, 8 bits or any other number of bits wide. In one non-limiting example, the CLSID may be 5 bits wide and the processing device 102 using this width of CLSID may contain up to $2^5$ clusters. The width of the PADDR for the cluster level may be 20, 30 or any other number of bits. In one non-limiting example, the PADDR for the cluster level may be 27 bits and the cluster 110 using this width of PADDR may contain up to $2^{27}$ memory locations and/or addressable registers. Therefore, in some embodiments, if the DEVID may be 20 bits wide, CLSID may be 5 bits and PADDR may have a width of 27 bits, a physical address DEVID:CLSID:PADDR or DEVID:CLSID:ADDR+BASE may be 52 bits.

For performing the virtual to physical memory conversion, the first register (ADDR register) may have 4, 5, 6, 7 bits or any other number of bits. In one non-limiting example, the first register may be 5 bits wide. If the value of the 5 bits register is four (4), the width of ADDR may be 4 bits; and if the value of 5 bits register is eight (8), the width of ADDR will be 8 bits. Regardless of ADDR being 4 bits or 8 bits wide, if the PADDR for the cluster level may be 27 bits then BASE may be 27 bits, and the result of ADDR+BASE may still be a 27 bits physical address within the cluster memory 118.

FIG. 3A shows that a cluster 110 may comprise one cluster memory 118. In another embodiment, a cluster 110 may comprise a plurality of cluster memories 118 that each may comprise a memory controller and a plurality of memory banks, respectively. Moreover, in yet another embodiment, a cluster 110 may comprise a plurality of cluster memories 118 and these cluster memories 118 may be connected together via a router that may be downstream of the router 112.

The AIP 114 may be a special processing engine shared by all processing engines 120 of one cluster 110. In one example, the AIP 114 may be implemented as a coprocessor to the processing engines 120. For example, the AIP 114 may implement less commonly used instructions such as some floating point arithmetic, including but not limited to, one or more of addition, subtraction, multiplication, division and square root, etc. As shown in FIG. 3A, the AIP 114 may be coupled to the router 112 directly and may be configured to send and receive packets via the router 112. As a coprocessor to the processing engines 120 within the same cluster 110, although not shown in FIG. 3A, the AIP 114 may also be coupled to each processing engines 120 within the same cluster 110 directly. In one embodiment, a bus shared by all the processing engines 120 within the same cluster 110 may be used for communication between the AIP 114 and all the processing engines 120 within the same cluster 110. In another embodiment, a multiplexer may be used to control communication between the AIP 114 and all the processing engines 120 within the same cluster 110. In yet another embodiment, a multiplexer may be used to control access to the bus shared by all the processing engines 120 within the same cluster 110 for communication with the AIP 114.

Figure 3B:
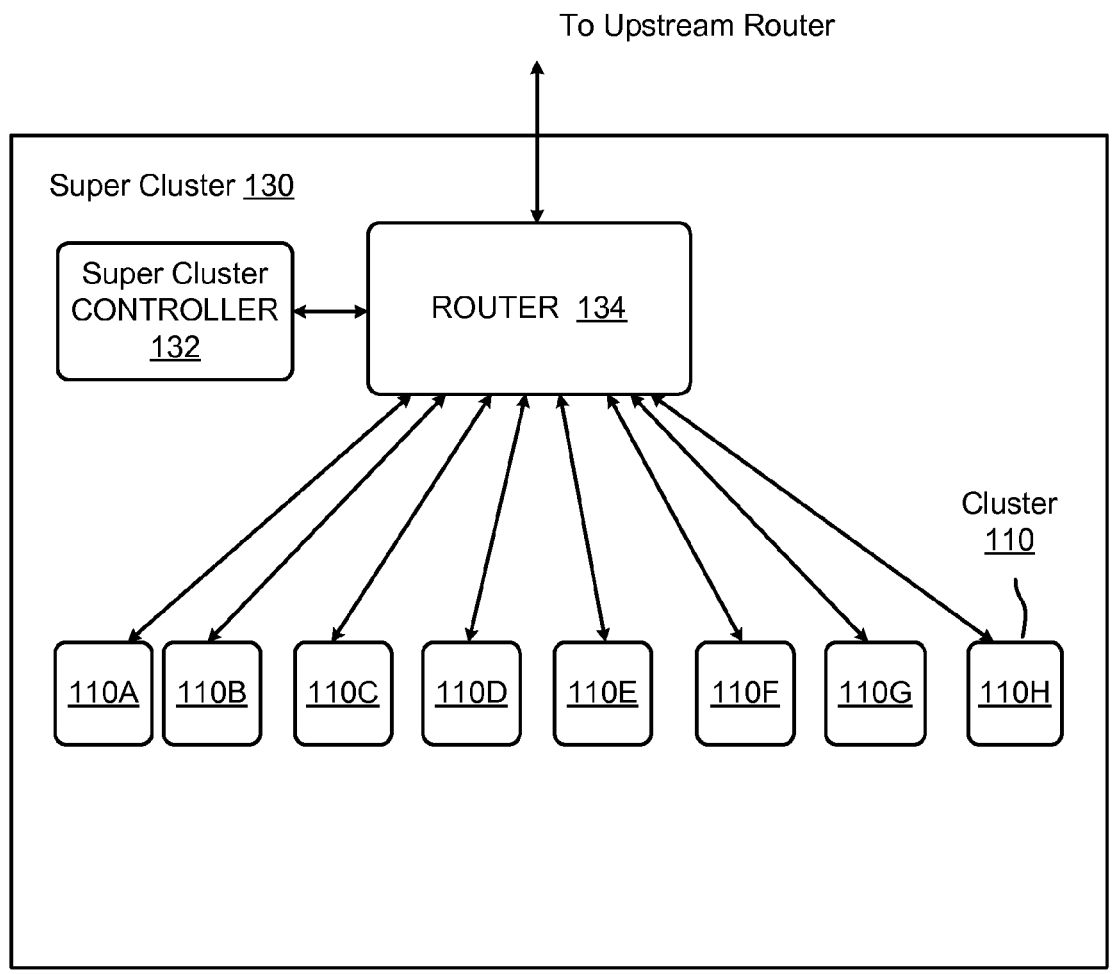
FIG. 3B is a block diagram of an exemplary super cluster according to the present disclosure.

The grouping of the processing engines 120 on a computing device 102 may have a hierarchy with multiple levels. For example, multiple clusters 110 may be grouped together to form a super cluster. FIG. 3B is a block diagram of an exemplary super cluster 130 according to the present disclosure. As shown on FIG. 3B, a plurality of clusters 110A through 110H may be grouped into an exemplary super cluster 130. Although 8 clusters are shown in the exemplary super cluster 130 on FIG. 3B, the exemplary super cluster 130 may comprise 2, 4, 8, 16, 32 or another number of clusters 110. The exemplary super cluster 130 may comprise a router 134 and a super cluster controller 132, in addition to the plurality of clusters 110. The router 134 may be configured to route packets among the clusters 110 and the super cluster controller 132 within the super cluster 130, and to and from resources outside the super cluster 130 via a link to an upstream router. In an embodiment in which the super cluster 130 may be used in a processing device 102A, the upstream router for the router 134 may be the top level router 104 of the processing device 102A and the router 134 may be an upstream router for the router 112 within the cluster 110. In one embodiment, the super cluster controller 132 may implement CCRs, may be configured to receive and send packets, and may implement a fixed-purpose state machine encapsulating packets and memory access to the CCRs, and the super cluster controller 132 may be implemented similar to the cluster controller 116. In another embodiment, the super cluster 130 may be implemented with just the router 134 and may not have a super cluster controller 132.

An exemplary cluster 110 according to the present disclosure may include 2, 4, 8, 16, 32 or another number of processing engines 120. FIG. 3A shows an example of a plurality of processing engines 120 that have been grouped into a cluster 110 and FIG. 3B shows an example of a plurality of clusters 110 that have been grouped into a super cluster 130. Grouping of processing engines is not limited to clusters or super clusters. In one embodiment, more than two levels of grouping may be implemented and each level may have its own router and controller.

Figure 4:
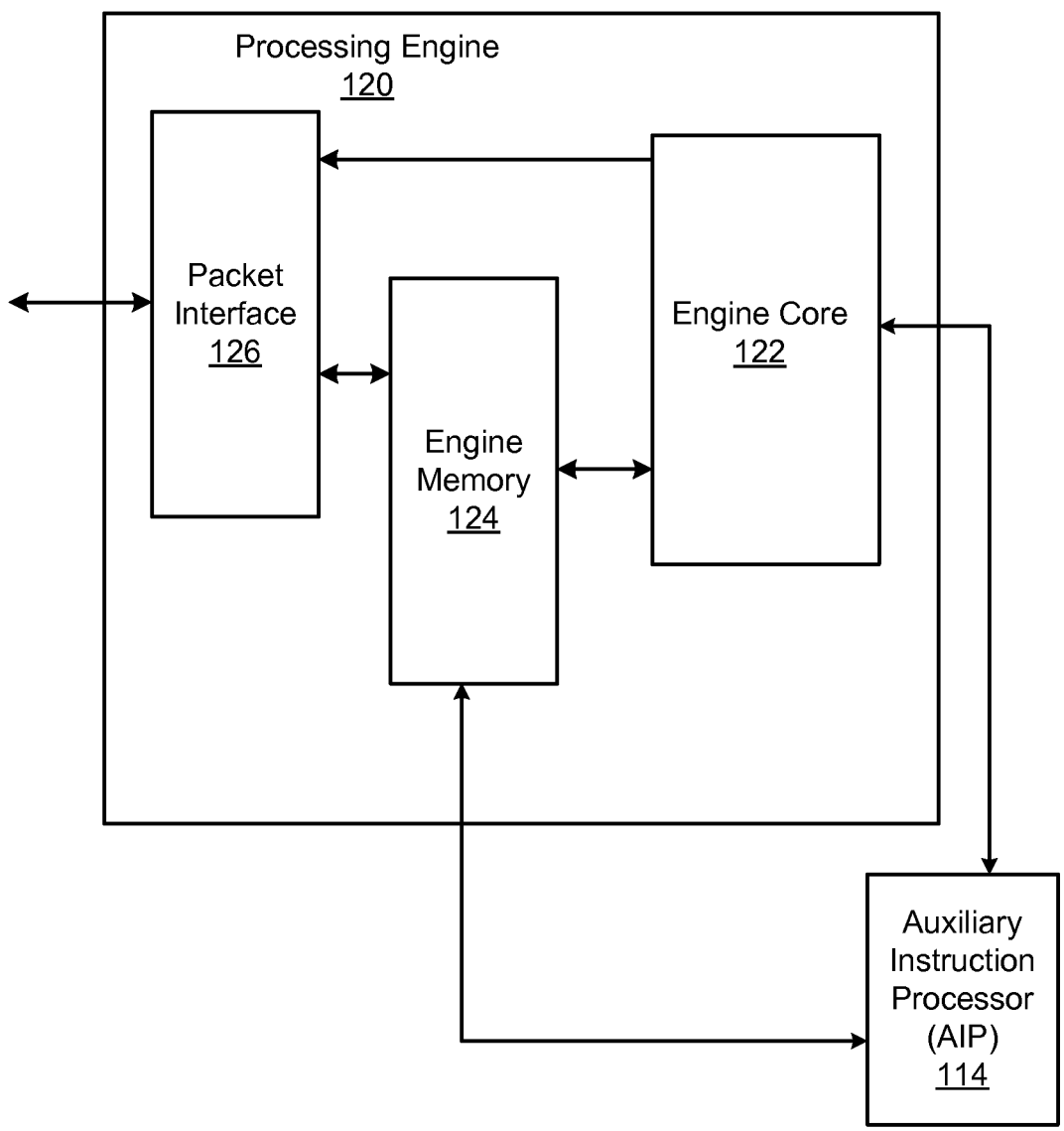
FIG. 4 is a block diagram of an exemplary processing engine according to the present disclosure.

FIG. 4 shows a block diagram of an exemplary processing engine 120 according to the present disclosure. As shown in FIG. 4, the processing engine 120 may comprise an engine core 122, an engine memory 124 and a packet interface 126. The processing engine 120 may be coupled to an AIP 114. As described herein, the AIP 114 may be shared by all processing engines 120 within a cluster 110. The processing core 122 may be a central processing unit (CPU) with an instruction set and may implement some or all features of modern CPUs, such as, for example, a multi-stage instruction pipeline, one or more arithmetic logic units (ALUs), a floating point unit (FPU) or any other existing or future-developed CPU technology. The instruction set may comprise one instruction set for the ALU to perform arithmetic and logic operations, and another instruction set for the FPU to perform floating point operations. In one embodiment, the FPU may be a completely separate execution unit containing a multi-stage, single-precision floating point pipeline. When an FPU instruction reaches the instruction pipeline of the processing engine 120, the instruction and its source operand(s) may be dispatched to the FPU.

The instructions of the instruction set may implement the arithmetic and logic operations and the floating point operations, such as those in the INTEL® x86 instruction set, using a syntax similar or different from the x86 instructions. In some embodiments, the instruction set may include customized instructions. For example, one or more instructions may be implemented according to the features of the computing system 100. In one example, one or more instructions may cause the processing engine executing the instructions to generate packets directly with system wide addressing. In another example, one or more instructions may have a memory address located anywhere in the computing system 100 as an operand. In such an example, a memory controller of the processing engine executing the instruction may generate packets according to the memory address being accessed.

The engine memory 124 may comprise a program memory, a register file comprising one or more general purpose registers, one or more special registers and one or more events registers. The program memory may be a physical memory for storing instructions to be executed by the processing core 122 and data to be operated upon by the instructions. In some embodiments, portions of the program memory may be disabled and powered down for energy savings. For example, a top half or a bottom half of the program memory may be disabled to save energy when executing a program small enough that less than half of the storage may be needed. The size of the program memory may be 1 thousand (1K), 2K, 3K, 4K, or any other number of storage units. The register file may comprise 128, 256, 512, 1024, or any other number of storage units. In one non-limiting example, the storage unit may be 32-bit wide, which may be referred to as a longword, and the program memory may comprise 2K 32-bit longwords and the register file may comprise 256 32-bit registers.

The register file may comprise one or more general purpose registers for the processing core 122. The general purpose registers may serve functions that are similar or identical to the general purpose registers of an x86 architecture CPU.

The special registers may be used for configuration, control and/or status. Exemplary special registers may include one or more of the following registers: a program counter, which may be used to point to the program memory address where the next instruction to be executed by the processing core 122 is stored; and a device identifier (DEVID) register storing the DEVID of the processing device 102.

In one exemplary embodiment, the register file may be implemented in two banks—one bank for odd addresses and one bank for even addresses—to permit fast access during operand fetching and storing. The even and odd banks may be selected based on the least-significant bit of the register address for if the computing system 100 is implemented in little endian or on the most-significant bit of the register address if the computing system 100 is implemented in big-endian.

The engine memory 124 may be part of the addressable memory space of the computing system 100. That is, any storage location of the program memory, any general purpose register of the register file, any special register of the plurality of special registers and any event register of the plurality of events registers may be assigned a memory address PADDR. Each processing engine 120 on a processing device 102 may be assigned an engine identifier (ENGINE ID), therefore, to access the engine memory 124, any addressable location of the engine memory 124 may be addressed by DEVID:CLSID:ENGINE ID: PADDR. In one embodiment, a packet addressed to an engine level memory location may include an address formed as DEVID:CLSID: ENGINE ID: EVENTS:PADDR, in which EVENTS may be one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits may be separate from the physical address being accessed.

The packet interface 126 may comprise a communication port for communicating packets of data. The communication port may be coupled to the router 112 and the cluster memory 118 of the local cluster. For any received packets, the packet interface 126 may directly pass them through to the engine memory 124. In some embodiments, a processing device 102 may implement two mechanisms to send a data packet to a processing engine 120. For example, a first mechanism may use a data packet with a read or write packet opcode. This data packet may be delivered to the packet interface 126 and handled by the packet interface 126 according to the packet opcode. The packet interface 126 may comprise a buffer to hold a plurality of storage units, for example, 1K, 2K, 4K, or 8K or any other number. In a second mechanism, the engine memory 124 may further comprise a register region to provide a write-only, inbound data interface, which may be referred to a mailbox. In one embodiment, the mailbox may comprise two storage units that each can hold one packet at a time. The processing engine 120 may have a event flag, which may be set when a packet has arrived at the mailbox to alert the processing engine 120 to retrieve and process the arrived packet. When this packet is being processed, another packet may be received in the other storage unit but any subsequent packets may be buffered at the sender, for example, the router 112 or the cluster memory 118, or any intermediate buffers.

In various embodiments, data request and delivery between different computing resources of the computing system 100 may be implemented by packets. FIG. 5 illustrates a block diagram of an exemplary packet 140 according to the present disclosure. As shown in FIG. 5, the packet 140 may comprise a header 142 and an optional payload 144. The header 142 may comprise a single address field, a packet opcode (POP) field and a size field. The single address field may indicate the address of the destination computing resource of the packet, which may be, for example, an address at a device controller level such as DEVID:PADDR, an address at a cluster level such as a physical address DEVID:CLSID:PADDR or a virtual address DEVID:CLSID:ADDR, or an address at a processing engine level such as DEVID:CLSID:ENGINE ID:PADDR or DEVID:CLSID:ENGINE ID:EVENTS: PADDR. The POP field may include a code to indicate an operation to be performed by the destination computing resource. Exemplary operations in the POP field may include read (to read data from the destination) and write (to write data (e.g., in the payload 144) to the destination).

In some embodiments, the exemplary operations in the POP field may further include bulk data transfer. For example, certain computing resources may implement a direct memory access (DMA) feature. Exemplary computing resources that implement DMA may include a cluster memory controller of each cluster memory 118, a memory controller of each engine memory 124, and a memory controller of each device controller 106. Any two computing resources that implemented the DMA may perform bulk data transfer between them using packets with a packet opcode for bulk data transfer.

In addition to bulk data transfer, in some embodiments, the exemplary operations in the POP field may further include transmission of unsolicited data. For example, any computing resource may generate a status report or incur an error during operation, the status or error may be reported to a destination using a packet with a packet opcode indicating that the payload 144 contains the source computing resource and the status or error data.

The POP field may be 2, 3, 4, 5 or any other number of bits wide. In some embodiments, the width of the POP field may be selected depending on the number of operations defined for packets in the computing system 100. Also, in some embodiments, a packet opcode value can have different meaning based on the type of the destination computer resources that receives it. By way of example and not limitation, for a three-bit POP field, a value 001 may be defined as a read operation for a processing engine 120 but a write operation for a cluster memory 118.

In some embodiments, the header 142 may further comprise an addressing mode field and an addressing level field. The addressing mode field may contain a value to indicate whether the single address field contains a physical address or a virtual address that may need to be converted to a physical address at a destination. The addressing level field may contain a value to indicate whether the destination is at a device, cluster memory or processing engine level.

The payload 144 of the packet 140 is optional. If a particular packet 140 does not include a payload 144, the size field of the header 142 may have a value of zero. In some embodiments, the payload 144 of the packet 140 may contain a return address. For example, if a packet is a read request, the return address for any data to be read may be contained in the payload 144.

Figure 6:
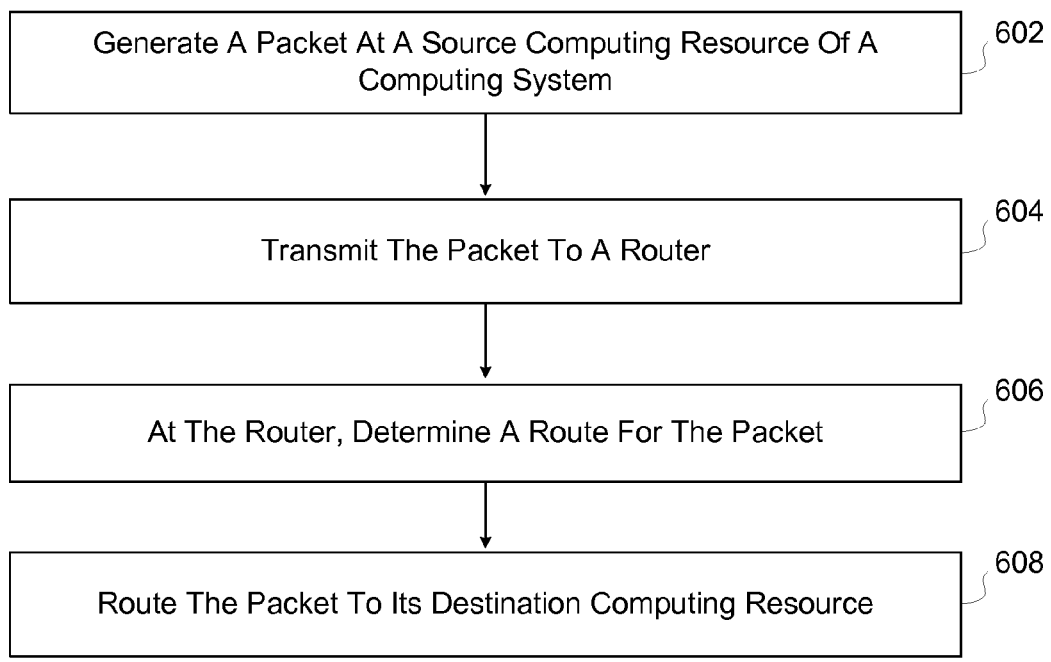
FIG. 6 is a flow diagram showing an exemplary process of addressing a computing resource using a packet according to the present disclosure.

FIG. 6 is a flow diagram showing an exemplary process 200 of addressing a computing resource using a packet according to the present disclosure. An exemplary embodiment of the computing system 100 may have one or more processing devices configured to execute some or all of the operations of exemplary process 600 in response to instructions stored electronically on an electronic storage medium. The one or more processing devices may include one or more devices configured through hardware, firmware, and/ or software to be specifically designed for execution of one or more of the operations of exemplary process 600.

The exemplary process 600 may start with block 602, at which a packet may be generated at a source computing resource of the exemplary embodiment of the computing system 100. The source computing resource may be, for example, a device controller 106, a cluster controller 118, a super cluster controller 132 if super cluster is implemented, an AIP 114, a memory controller for a cluster memory 118, or a processing engine 120. The generated packet may be an exemplary embodiment of the packet 140 according to the present disclosure. From block 602, the exemplary process 600 may continue to the block 604, where the packet may be transmitted to an appropriate router based on the source computing resource that generated the packet. For example, if the source computing resource is a device controller 106, the generated packet may be transmitted to a top level router 104 of the local processing device 102; if the source computing resource is a cluster controller 116, the generated packet may be transmitted to a router 112 of the local cluster 110; if the source computing resource is a memory controller of the cluster memory 118, the generated packet may be transmitted to a router 112 of the local cluster 110, or a router downstream of the router 112 if there are multiple cluster memories 118 coupled together by the router downstream of the router 112; and if the source computing resource is a processing engine 120, the generated packet may be transmitted to a router of the local cluster 110 if the destination is outside the local cluster and to a memory controller of the cluster memory 118 of the local cluster 110 if the destination is within the local cluster.

At block 606, a route for the generated packet may be determined at the router. As described herein, the generated packet may comprise a header that includes a single destination address. The single destination address may be any addressable location of a uniform memory space of the computing system 100. The uniform memory space may be an addressable space that covers all memories and registers for each device controller, cluster controller, super cluster controller if super cluster is implemented, cluster memory and processing engine of the computing system 100. In some embodiments, the addressable location may be part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet may determine the route for the generated packet based on the single destination address. At block 608, the generated packet may be routed to its destination computing resource.

Figure 7:
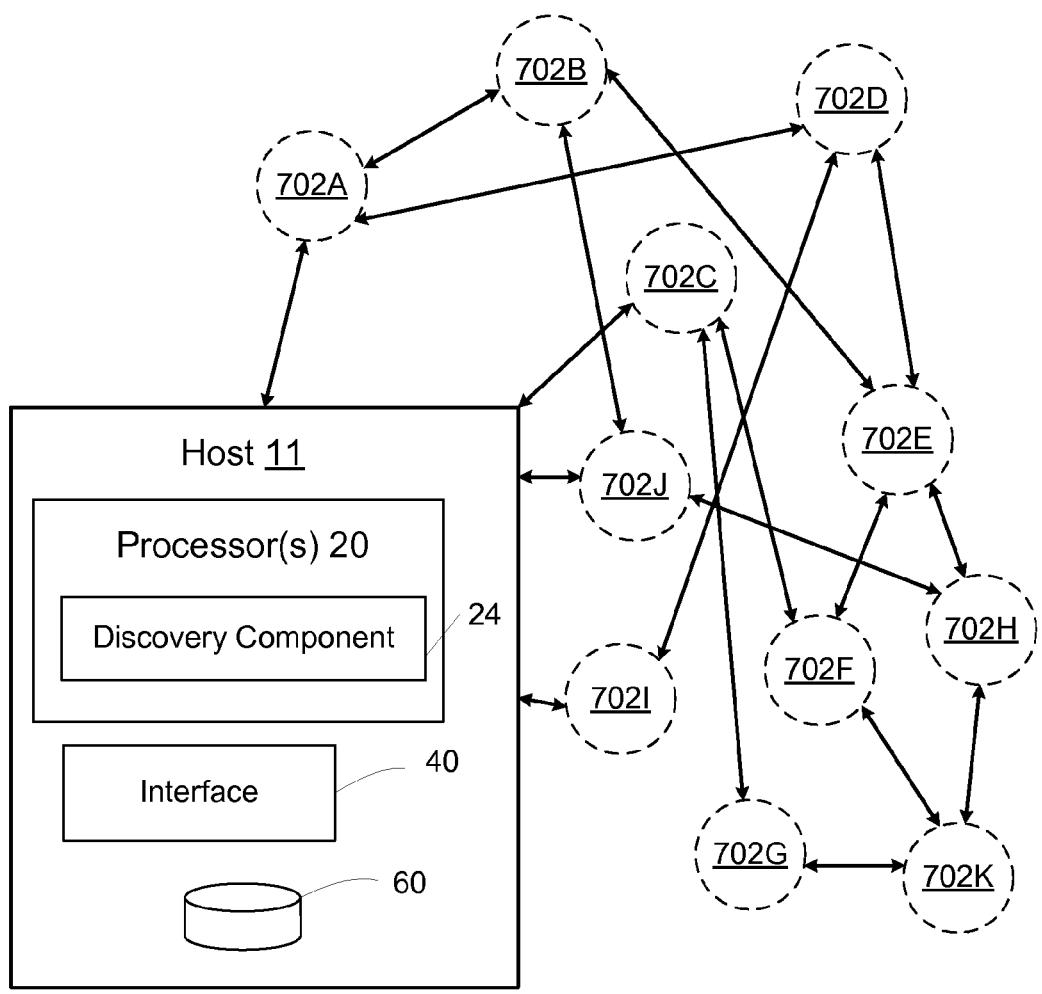
FIG. 7 is a block diagram of an exemplary computer network according to the present disclosure.

FIG. 7 illustrates an exemplary computer network 700 according to the present disclosure. The exemplary computer network 700 may comprise a plurality of nodes. Each of the plurality of nodes may be a computing device. One such computing device may be designated as a host, such as the host 11 shown in FIG. 7. Other computing devices may be the nodes 702A through 702K, which may also be referred to as computing devices 702A through 702K. Each of the computing devices may be assigned an identifier, which may be referred to as a computing device ID, to uniquely identify the respective computing device in the computer network 700. The host 11 may have a unique identifier that each of the computing devices 702A through 702K recognize as the host identifier. The number of the computing devices 702 may be as low as a couple or as high as hundreds of thousands, or even higher, limited only by the width of computing device identifier. The exact number of computing devices 702 is immaterial and thus, the computing devices 702 are shown in phantom.

The computing devices 702 may be the same type or different types of computing devices. Exemplary computing device may be a computer (such as but not limited to, a commercially available personal computer, a commercially available server computer, a computer built using one or more processing devices 102 as CPUs) or a computer processor (such as but not limited to, a commercially available single core computer processor, a commercially available multi-core processor, or a processing device 102). The host 11 may be the same type of computing device as at least one of the computing device 702 or may be a different type of computing device from all the computing devices 702. In one embodiment, all of the computing devices 702 may be processing devices 102, and the computer network 700 may be one exemplary embodiment of the system 100 and may implement all features of the computing system 100 described herein. In another embodiment, all of the computing devices 702 may be computers comprising processing devices 102, and each computing device 702 may be one exemplary embodiment of the system 100 and may implement some or all of the features of the computing system 100 according to the present disclosure.

In one embodiment, the computing devices 702 may have multiple network interfaces. For example, if the computing device 702 is a computer, that computer may have at least two, but maybe more, network cards; on the other hand, if the computing device 702 is a computer processor, the computer processor itself or its mother board may have at least two but may be more network ports.

In one embodiment, the bidirectional links between the computing devices may represent direct links between the computing devices. In one embodiment, a direct link may be a point to point wired link with one end coupled to a network card or network port on one computing device and another end coupled to a network card or network port on another computing device. In another embodiment, there may be other components on a direct link, such as but not limited to, a signal booster, or a relay. In yet another embodiment, a direct link may be a wireless communication link. Regardless of the types of links, communication between the computing devices (including the host 11 and computing devices 702) may be based on packets. The packets may be in a format in accordance with a network protocol implemented by both the sender and the receiver. For example, the packets may be IP packets if both the sender and receiver implement the TCP/IP network protocols. In an embodiment, the computing devices 702 may be processing devices 102, and the packets may be embodiments of the packet shown in FIG. 5. Other packets may also be used, including packets according to any existing or future-developed network protocols.

In one embodiment, the network among the computing devices of the computer network 700 may be a homogeneous network. That is, the network may include only one type of network connections, such as but not limited to, one of Ethernet, Asynchronous Transfer Mode (ATM), and Gigabit Ethernet, etc. In another embodiment, the network among the computing devices of the computer network 700 may be a heterogeneous network and include a variety of types of network connections. For example, the host 11 may have an Ethernet connection to the computing device 702A, an Asynchronous Transfer Mode (ATM) connection to the computing device 702J, and a Gigabit Ethernet connection to the computing device 702C, and each of computing devices 702A, 702J and 702C may have other types of network connections to other computing devices that are connected to them.

The host 11 may comprise one or more processors 20, a physical storage 60, and an interface 40. Interface 40 may be configured to provide an interface between the computer network 700 and a user (e.g., a system administrator) through which the user can provide and/or receive information. This enables data, results, and/or instructions and any other communicable items, collectively referred to as "information," to be communicated between the user and the computer network 700. Examples of interface devices suitable for inclusion in interface 40 include a keypad, buttons, switches, a keyboard, knobs, levers, a display screen, a touch screen, speakers, a microphone, an indicator light, an audible alarm, and a printer. Information may be provided by interface 40 in the form of auditory signals, visual signals, tactile signals, and/or other sensory signals.

It is to be understood that other communication techniques, either hard-wired or wireless, are also contemplated herein as interface 40. For example, in some implementations, interface 40 may be integrated with physical storage 60. In this example, information is loaded into the host 11 from storage (e.g., a smart card, a flash drive, a removable disk, etc.) that enables the user(s) to customize the implementation of the host 11. Other exemplary input devices and techniques adapted for use with the host 11 as interface 40 include, but are not limited to, an RS-232 port, RF link, an IR link, modem (telephone, cable, Ethernet, internet or other). In short, any technique for communicating information with the host 11 is contemplated as interface 40.

Physical storage 60 of the host 11 in FIG. 7 may comprise electronic storage media that stores information. In some implementations, physical storage 60 may store representations of computer program components, including instructions that implement the computer program components. The electronic storage media of physical storage 60 may include one or both of system storage that is provided integrally (i.e., substantially non-removable) with host 11 and/or removable storage that is removably connectable to host 11 via, for example, a port (e.g., a USB port, a FIREWIRE port, etc.) or a drive (e.g., a disk drive, etc.). Physical storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Physical storage 60 may include virtual storage resources, such as storage resources provided via a cloud and/or a virtual private network. Physical storage 60 may store software algorithms, information determined by processor 20, information received from outside of host 11, and/or other information that enable host 11 and computer network 700 to function properly. Physical storage 60 may be one or more separate components within the host 11, or physical storage 60 may be provided integrally with one or more other components of the host 11 (e.g., processor 20).

One or more processors 20 (interchangeably referred to herein as processor 20) may be configured to execute one or more computer program components. The computer program components may include a discovery component 24, and/or other components. The functionality provided by component 24 may be attributed for illustrative purposes to one or more particular components of host 11. This is not intended to be limiting in any way, and any functionality may be provided by any component or entity described herein.

The functionality provided by the discovery component 24 may be used to discover the topology of the computer network 700. As used herein, the topology may comprise information that shows how the computing devices 702 may be interconnected. In one embodiment, the computer network 700 may be configured to discover the interconnections of the computing devices 702 in two phases. During the first phase, the host 11 may send a packet to each of its network interfaces that has a link coupled to it. For example, as shown in FIG. 7, the host 11 may have links to computing devices 702A, 702C, 702J and 702I, and the host 11 may send a packet to the computing devices 702A, 702C, 702J and 702I, respectively. Regardless of its format or network protocol, the packet may contain a piece of information to identify itself as a neighbor discovery packet. For example, the packet may contain a label (in its header or payload), such as but not limited to, "NEIGHBOR-DISCOVERY" or a sequence of bits "00001." In one embodiment, the sender's computing device ID may also be included in the packet. In another embodiment, the sender's computing device ID is not needed in the packet.

In one embodiment, the recipient of the neighbor discovery packet may then create and send further neighbor discovery packets on all the ports other than the one on which the neighbor discovery packet was received. In another embodiment, the recipient of the neighbor discovery packet has an indication of whether each port is connected or disconnected. In this embodiment, the recipient of the neighbor discovery packet may send a further neighbor discovery packet only out of those ports that are connected. For example, the computing device 702A may have links to the computing devices 702B and 702D in addition to the host 11, so it may send a further neighbor discovery packet to the computing devices 702B and 702D, respectively. In the embodiment in which the neighbor discovery packet contains the sender's computing device ID, the computing device ID for the computing device that sends a further neighbor discovery packet will be included as the sender's computing device ID.

The recipient of the neighbor discovery packet may record the network interface (e.g., a port number) on which the neighbor discovery packet is received and generate a neighbor discovery reply packet. The recorded network interface information may be maintained, for example, in a database, table, file or data structure with appropriate fields, entries, records or the like. The neighbor discovery reply packet may contain the recipient's computing device ID and a piece of information to identify itself as a neighbor discovery reply packet. The piece of information may be, for example, a label (in its header or payload), such as but not limited to, "NEIGHBOR-DISCOVERY-REPLY" or a sequence of bits "00010." The recipient may send the neighbor discovery reply packet on the same network interface on which the neighbor discovery packet is received. That is, the neighbor discovery reply packet may be sent back to the sender of the neighbor discovery packet on a one-to-one mapping. For example, the host 11 may receive respective neighbor discovery reply packets from the computing devices 702A, 702C, 702J and 702I; and the computing device 702A may receive respective neighbor discovery reply packets from the computing devices 702B and 702D.

A computing device 702 may receive neighbor discovery packets on multiple network interfaces. For example, the computing device 702B may receive one neighbor discovery packet on the network interface that is connected to the computing device 702A and another neighbor discovery packet on the network interface that is connected to the computing device 702J. In one embodiment, the computing device 702 may send a further neighbor discovery packet only responsive to the first neighbor discovery packet it receives, but it still needs to respond to all received neighbor discovery packets with neighbor discovery reply packets. For example, the computing device 702B may receive the neighbor discovery packet on the network interface connected to the computing device 702J first. In this case, although the computing device 702B will receive neighbor discovery packets from both the computing devices 702A and 702J, it only sends further neighbor discovery packets responsive to the first neighbor discovery packet it receives from the computing device 702J. The further neighbor discovery packets will be sent to both computing devices 702A and 702E because these two computing devices are coupled to by network interfaces other than the one on which the first neighbor discovery packet is received. Further, the computing device 702B needs to generate and send two neighbor discovery reply packets responsive to the neighbor discovery packets from the computing devices 702A and 702J respectively.

Once the neighbor discovery reply packets are received by the senders of the neighbor discovery packets, these senders may record the network interface (e.g., the port number) on which the individual neighbor discovery reply packet was received and generate a map of its neighboring computing devices. The first phase may conclude once each computing device 702 has completed this process and generated a map of its neighboring computing devices, which may also be referred simply as neighbors. In one embodiment, the map may be in a format of a database, table, file and data structure that contain entries for each neighboring computing device ID and its corresponding network interface.

The computer network 700 may implement some mechanism to mark the conclusion of the first phase. In one embodiment, the host 11 may have a timer that starts counting when it sends the first neighbor discovery packet. Each time a computing device receives the first neighbor discovery packet, it may respond by sending a status reporting packet on the network interface on which the first neighbor discovery packet is received. The status reporting packet may be forwarded by each receiving computing device on the network interface on which it receives its first neighbor discovery packet and may ultimately be received by the host 11. The host 11 may reset the timer each time such a status reporting packet is received. The conclusion of the first phase may be determined when the timer's counting reaches a predetermined amount of time, for example, 1 millisecond, 2 milliseconds, or another amount of time, which may be programmable. In one embodiment, the predetermined amount of time may be configured based on the size of the network 700.

In one embodiment, the discovery component 24 may be configured to send the neighbor discovery packet, respond with the neighbor discovery reply packets and generate the map of neighboring computing devices. Each computing device 702 may also implement these features in a component similar to the discovery component 24, which may be implemented in hardware, software or combination of both.

The second phase of the discovery may start by the host 11 sending out packets to inquire about each computing devices' connections. In one embodiment, the discovery component 11 of the host 11 may be configured to send out a connection discovery packet to each of its immediate neighbors. Referring to FIG. 7, because the host 11 is directly coupled to computing devices 702A, 702C, 702J and 702I, the connection discovery packets may be sent computing devices 702A, 702C, 702J and 702I, respectively.

Each computing device 702 may be configured to handle a connection discovery packet by recording the network interface on which the connection discovery packet is received. For example, the computing device 702A may record the network interface linked to the host 11 as a "host-ward" network interface. Each computing device 702 may also be configured to send a connection discovery reply packet (on that host-ward network interface) containing the computing device IDs of the computing devices to which the computing device 702 is directly connected (e.g., as recorded in the previous phase). For example, the computing device 702A may reply that it is directly connected to the computing devices 702B and 702D; the computing device 702C may reply that it is directly connected to the computing devices 702G and 702F; the computing device 702J may reply that it is directly connected to the computing devices 702B and 702H; and the computing device 702I may reply that it is directly connected to the computing device 702D.

Each computing device 702 may also be configured to forward the received connection discovery packet to all network interfaces that are connected by links to other computing devices 702. For example, the computing device 702A may forward the received connection discovery packet to the computing devices 702B and 702D; the computing device 702C may forward the received connection discovery packet to the computing devices 702G and 702F; the computing device 702J may forward the received connection discovery packet to the computing devices 702B and 702H; and the computing device 702I may forward the received connection discovery packet to the computing device 702D.

In one embodiment, a computing device 702 may be configured to process the first connection discovery packet it receives by recording the network interface on which the first connection discovery packet is received, and to ignore any subsequently received connection discovery packet(s). For example, the computing device 702D may receive the connection discovery packets from the computing devices 702A and 702I respectively. For whatever reason, one of the connection discovery packets may be received earlier than the other. In that case, the first one maybe recorded, responded to and forwarded, and the second one may be ignored. For example, if the first one is the connection discovery packet received from the computing device 702A, then this one may be recorded, responded to and forwarded (e.g., to the computing devices 702I and 702E); and the second one received from the computing device 702I may be ignored.

The computing devices 702 may also receive connection discovery reply packet(s) responding to any connection discovery packet(s) they forwarded to neighboring computing device(s) 702. The connection discovery reply packet(s) may also include connection discovery reply packet(s) received by the neighboring computing device(s) 702 after it (they) forwarded the connection discovery packet. In one embodiment, the computing devices 702 may be configured to forward the connection discovery reply packet(s) they receive on their respective "host-ward" network interface.

Because the connection discovery reply packets are all sent on the "host-ward" network interface, the host 11 will ultimately receive all of the connection discovery reply packets. Based on the connection discovery reply packets, the host 11 may build a complete map of all connection(s) from every computing device 702 to every other computing devices 702 in the computer network 700. Reference to a complete map of all connections is intended to refer to a record of all the connections between and among all the computing devices and the host in the network 700. Such a record may be maintained, for example, in a database, table, file or data structure with appropriate fields, entries, records or the like to indicate, for each computing device 702 (or host), all other computing device(s) (or host) to which the particular computing device is connected and the network interface through which the connection is implemented.

In one embodiment, each computing device 702 may be configured to store a look-up table that may describe how packets are to be routed. After building the complete map of the physical connections between computing devices 702, the host 11 may send out programming packets to program these look-up tables. The programming packets may contain routing information to define the routing to be used by each computing device 702. The host 11 may first program the look-up tables of the computing device(s) to which the host 11 is directly connected, and then the computing devices 702 to which those already programmed are directly connected may be programmed, and the process may be repeated to all computing devices 702 in the network.

At the conclusion of the process, the host 11 may have a map of all the physical connections in the computer network 700. Each computing device 702 may also have a map of its physical connections to its neighbors, and its lookup table programmed to indicate how to route packets to a computing device to which the computing device from which the packet originates is not directly connected. For example, with respect to the embodiment FIG. 7, the computing device 702G has no direct connection to the computing device 702F. At the conclusion of the process, the look up table associated with the computing device 702G may be programmed such that a packet that is to be sent from the computing device 702G to the computing device 702F is sent to the computing device 702C which will then forwarded to the computing device 702F. In one embodiment, the look up tables may also be programmed to include alternative routes. For example, the route from the computing device 702G through the computing device 702C to the computing device 702F may be designated as a primary path and the route from the computing device 702G through the computing device 702K to the computing device 702F may be designated as a secondary path. Secondary paths may be used when, for example, the primary path is not available (e.g., because of a hardware or software malfunction along the primary path) or when the primary path is unduly slow or experiences delay (e.g., because of congestion).

In one embodiment, the discovery component 24 may be configured to send the connection discovery packet and generate the complete map. Programming look-up tables of the computing devices 702 may be optionally implemented by the discovery component 24 but may also be implemented by other components of the host 11.

In some embodiments, the computing devices 702 may be embodiments of the processing devices 102, the functionality for the topology discovery may be implemented in hardware, software or both by the device controller 106 of each processing device 102. Further, in such an embodiment, the look up tables may be maintained in the top level router 104 of each processing device 102.

Referring to FIG. 7, one or more processors 20 may be configured to provide information-processing capabilities in the computer network 700 and/or host 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 7 as a single entity, this is for illustrative purposes only. In one embodiment, processor 20 may include a plurality of processing units. For example, each processor 20 may be a processing device 102 as described herein or a processor of a different type. These processing units may be physically located within the same physical apparatus, or processor 20 may represent processing functionality of a plurality of apparatuses operating in coordination (e.g., "in the cloud", and/or other virtualized processing solutions).

The description of the functionality provided by the discovery components 24 described herein is for illustrative purposes, and is not intended to be limiting, as the discovery component 24 may provide more or less functionality than is described. For example, the discovery component 24 may be eliminated and some or all of its functionality may be provided in other components (not shown) of host 11.

Figure 8:
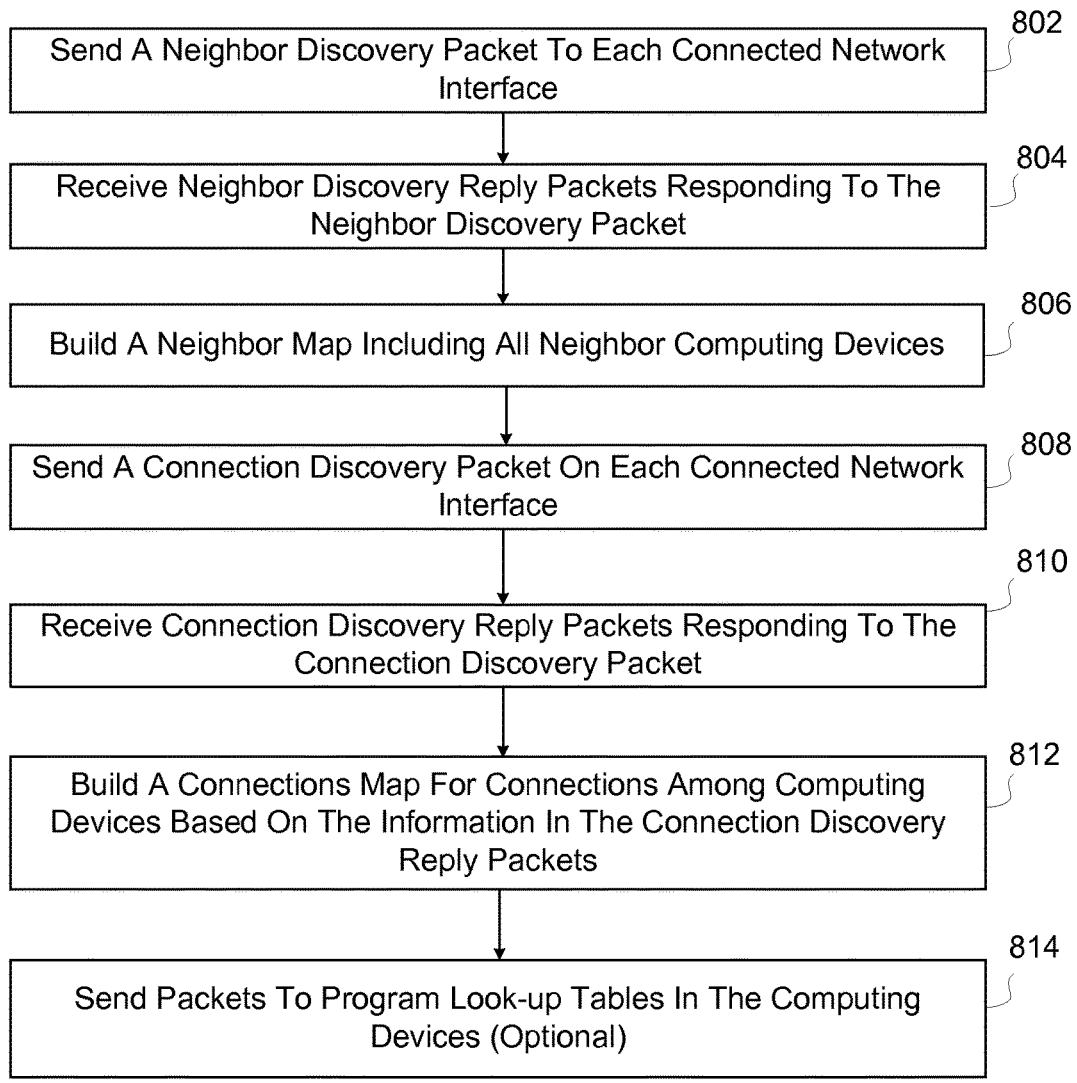
FIG. 8 is a flow diagram showing an exemplary process for a host computing device to discover topology of an exemplary computer network according to the present disclosure.

FIG. 8 illustrates an exemplary process 800 for discovering topology of a computer network by a host of the computer network according to the present disclosure. In some implementations, the exemplary process 800 may be accomplished with one or more additional operations not described, and/or without one or more of the operations discussed. Additionally, the order in which the operations of process 800 are illustrated in FIG. 8 and described below is not intended to be limiting.

The exemplary process 800 may start with block 802, at which a neighbor discovery packet may be sent to each network interface with physical connections. For example, as shown in FIG. 7, the host 11 may be connected to the computing devices 702A, 702C, 702J and 702I and the host 11 may be configured to send a neighbor discovery packet to the network interfaces connected to each of the computing devices 702A, 702C, 702J and 702I, respectively.

At block 804, the host 11 may receive the neighbor discovery reply packets in response to the neighbor discovery packets. The neighbors may send neighbor discovery reply packets to the host 11 in response to the neighbor discovery packets. For example, the host 11 may receive neighbor discovery reply packets from the computing devices 702A, 702C, 702J and 702I and the neighbor discovery reply packets may contain the computing device IDs for the computing devices 702A, 702C, 702J and 702I respectively. As described above with respect to FIG. 7, in one embodiment, each neighbor discovery reply packet may contain the neighbor discovery packet recipient's computing device ID and thus, the computing devices 702A, 702C, 702J and 702I may include their respective computing device IDs in the respective neighbor discovery reply packets. At block 806, a neighbor map may be built that may include all neighbor computing devices. For example, the host 11 may build a map for all its neighbor computing devices, in this case, the computing devices 702A, 702C, 702J and 702I. As described above with respect to FIG. 7, the map may also include the network interface information for linking the host 11 to each of the neighbors.

At block 808, the host 11 may send a connection discovery packet to each computing device to which it is connected. For example, in the embodiment of FIG. 7, the host 11 may send connection discovery packets to the computing devices 702A, 702C, 702J and 702I on respective network interfaces that are connected to these computing devices. At block 810, connection discovery reply packets to the connection discovery packet may be received. As described above with respect to FIG. 7, the computing devices 702 may generate connection discovery reply packets to report their connections with other computing devices 702 in response to the connection discovery packet, and they may also forward the connection discovery packet to its neighbors, and forward the connection discovery reply packets it receives from its neighbors back to the host 11 (e.g., via the "host-ward" network interface). In one embodiment, the host 11 may implement a programmable maximum wait period for receiving the connection discovery reply packets.

At block 812, a connections map may be built for connections among the computing devices 702 based on the information in the connection discovery reply packets. For example, each connection discovery reply packet may include the connections information for the computing device 702 that sends the connection discovery reply packet. The host 11 may obtain the connections information from all connection discovery reply packets and build the connections map. At optional block 814, one or more packets may be sent to program look-up tables in the computing devices. As described above with respect to FIG. 7, the computing devices 702 may each contain a look-up table and the host 11 may use the connections map to program each computing device 702 to configure the routing information for each computing device 702.

Figure 9:
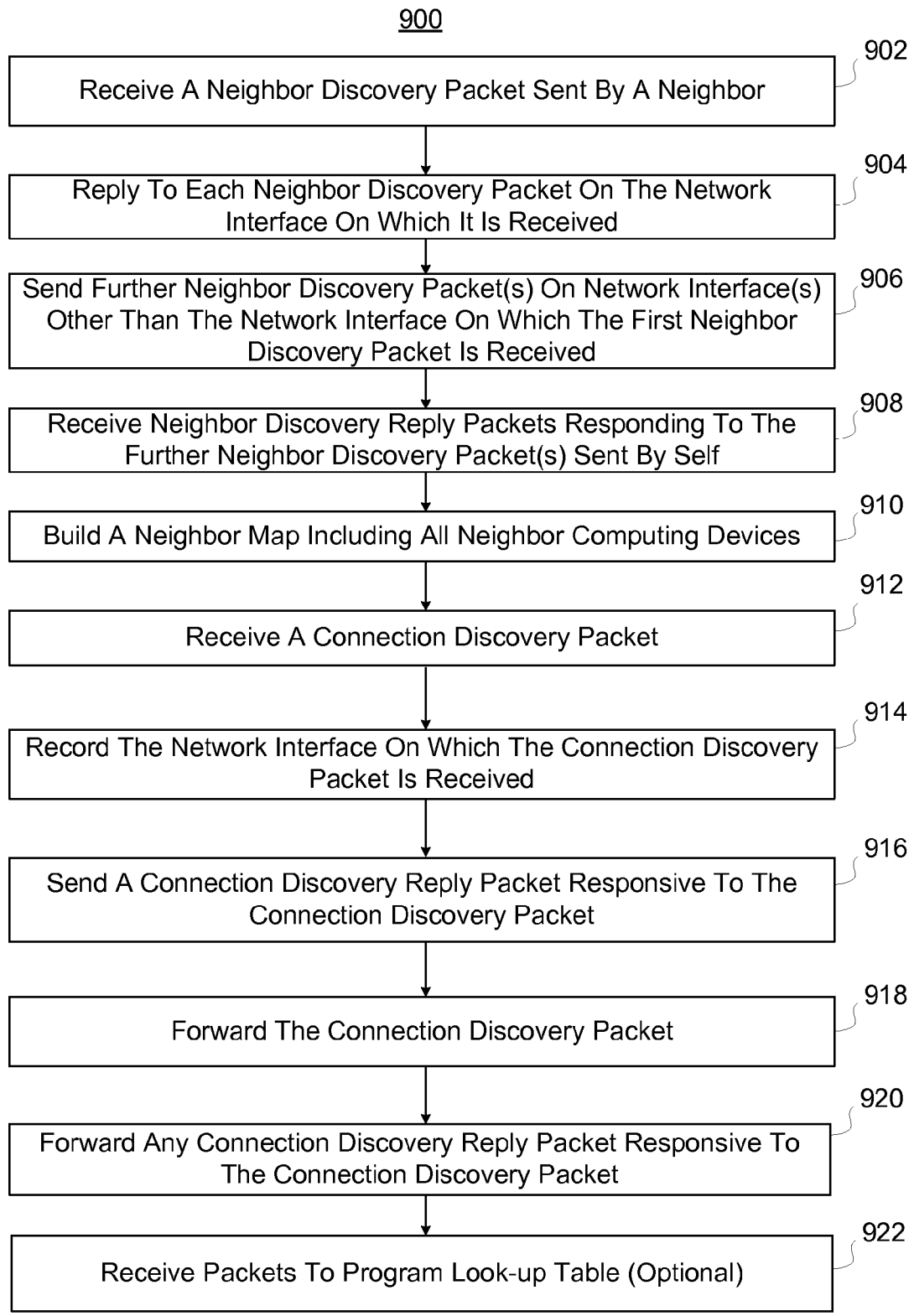
FIG. 9 is a flow diagram showing an exemplary process of a computing device participating in discovery of topology of an exemplary computer network according to the present disclosure.

FIG. 9 illustrate an exemplary process 900 for a computing device in a network to participate topology discovery according to the present disclosure. In some implementations, the exemplary process 900 may be accomplished with one or more additional operations not described, and/or without one or more of the operations discussed. Additionally, the order in which the operations of process 900 are illustrated in FIG. 9 and described below is not intended to be limiting.

The exemplary process 900 may start with block 902, a neighbor discovery packet sent by a neighbor may be received. In the exemplary network 700, each computing device 702 may be connected to several other computing devices 702 by direct links. For example, as shown in FIG. 7, the computing device 702B may be directly connected to the computing devices 702A, 702J and 702E respectively, and thus, the computing device 702B may receive neighbor discovery packets from the computing devices 702A and 702B respectively.

At block 904, neighbor discovery reply packets to the neighbor discovery packets may be sent on the network interfaces on which the respective neighbor discovery packets are received. For example, the computing device 702B may receive neighbor discovery packets from the computing devices 702A and 702J respectively, and thus, the computing device 702B may send neighbor discovery reply packets on the respective network interfaces linked to the computing devices 702A and 702J. As described above with respect to FIG. 7, in one embodiment, each neighbor discovery reply packet may contain the neighbor discovery packet recipient's computing device ID and thus, the computing device 702B may include its computing device ID in the neighbor discovery reply packets.

At block 906, the computing device 702 may send further neighbor discovery packet(s) on network interface(s) other than the network interface on which the first neighbor discovery packet is received. As described with response to FIG. 7, a computing device 702 may receive several neighbor discovery packets, and may generate and send further neighbor discovery packet(s) only responsive to the first neighbor discovery packet it receives.

At block 908, the computing device 702 which sent the further neighbor discovery packets may receive neighbor discovery reply packets in response to the further neighbor discovery packets. The neighbors may send neighbor discovery reply packets in response to receiving the further neighbor discovery packets. For example, the computing device 702B may receive neighbor discovery reply packets from the computing devices 702A and 702E because it receives the neighbor discovery packet from the computing device 702J first and hence only sends further neighbor discovery packets to the computing devices 702A and 702E. The neighbor discovery reply packets may contain the computing device IDs for the computing devices 702A and 702E respectively. At block 910, a neighbor map may be built that may include all neighbor computing devices. For example, the computing device 702B may build a map for all its neighbor computing devices, in this case, the computing device 702J from which the computing device 702B may receive the first neighbor discovery packet and the computing devices 702A and 702E that respond to the further neighbor discovery packet with their respective neighbor discovery reply packets. As described above with respect to FIG. 7, the map may also include the network interface information for linking the computing device 702B to each of the neighbors.

At block 912, a connection discovery packet may be received. For example, the computing device 702A may receive a connection discovery packet from the host 11 directly, the computing device 702B may receive connection discovery packets from the computing devices 702A and 702J, and so forth. At block 914, the network interface on which the connection discovery packet is received may be recorded. As described with respect to FIG. 7, in one embodiment, the first received connection discovery packet may be processed and any subsequent connection discovery packet(s) may be ignored and the network interface that received the first received discovery packet may be recorded as "host-ward." At block 916, a connection discovery reply packet responsive to the connection discovery packet may be sent. The connection discovery reply packet may include, for example, the connections information for the computing device that is originating the connection discovery reply packet. The connections information may be based on the neighbor map built at block 910.

At block 918, the connection discovery packet may be forwarded. As described above with respect to FIG. 7, a computing device 702 may be configured to forward the connection discovery packet to its neighbors. For example, the computing device 702A may forward the connection discovery packet to the computing devices 702B and 702D. At block 920, any connection discovery reply packets responsive to the connection discovery packets received from neighbors may be forwarded back to the host, for example, using the "host-ward" network interface. At optional block 922, one or more packets may be received to program look-up tables in the computing devices. As described herein, the computing devices 702 may each contain a look-up table and the host 11 may use the connections map program each computing device 702 to configure the routing information for each computing device 702.

In one embodiment, the host 11 and all computing devices 702 may participate in the topology discovery process and therefore, some operations the processes 800 and 900 may be performed by the host 11 and respective computing devices 702 in an interleaved manner.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A method for discovering topology of a computer network that has a plurality of computing devices, comprising:
    sending, by a host of the computing network, a neighbor discovery packet on each network interface of a plurality of network interfaces, including sending a first neighbor discovery packet on a first network interface;
    receiving a first neighbor discovery reply packet responsive to the first neighbor discovery packet;
    building a neighbor map for all neighbor computing devices to the host using the first neighbor discovery reply packet;
    sending a connection discovery packet on each network interface of the host that has a connection, including sending a first connection discovery packet via the first network interface to a first computing device;
    receiving a first connection discovery reply packet responsive to the first connection discovery packet via the first network interface, the first connection discovery reply packet being originated from the first computing device;
    receiving a second connection discovery reply packet responsive to the first connection discovery packet via the first network interface, the second connection discovery reply packet being originated from a second computing device different from the first computing device; and
    building a connection map for connections among computing devices using the information in the first connection discovery reply packet and the second connection discovery reply packet.

2. The method of claim 1, wherein the first neighbor discovery reply packet to the first neighbor discovery packet includes an identifier for a neighbor sending the first neighbor discovery reply packet, and the neighbor map includes the identifier for the neighbor sending the first neighbor discovery reply packet and an identifier of a network interface on which the first neighbor discovery reply packet is received.

3. The method of claim 1, further comprising sending one or more packets to each computing device in the computer network with routing information, wherein the routing information specifies a network interface through which the computing device is configured to transmit a network packet destined for another computing device.

4. The method of claim 1, wherein the plurality of computing devices are computers that each have multiple network interfaces.

5. The method of claim 1, wherein the plurality of computing devices are computer processors that each have multiple network ports.

6. A computing device for use as host of a computer network that has a plurality of computing devices, comprising:
    a plurality of network interfaces to be coupled to other computing devices in the computer network;
    a processor configured to:
        send a neighbor discovery packet on each network interface of the plurality of network interfaces, including sending a first neighbor discovery packet on a first network interface;
        receive a first neighbor discovery reply packet responsive to the first neighbor discovery packet;
        build a neighbor map for all neighbor computing devices to the host;
        send a connection discovery packet to each neighbor computing device, including sending a first connection discovery packet via the first network interface to a first computing device;
        receive a first connection discovery reply packet responsive to the first connection discovery packet via the first network interface, the first connection discovery reply packet being originated from the first computing device;
        receive a second connection discovery reply packet responsive to the first connection discovery packet via the first network interface, the second connection discovery reply packet being originated from a second computing device different from the first computing device; and
        build a connection map for connections among computing devices using the information in the first connection discovery reply packet and the second connection discovery reply packet.

7. The computing device of claim 6, wherein the first neighbor discovery reply packet to the first neighbor discovery packet includes an identifier for a neighbor sending the neighbor discovery reply packet, and the neighbor map includes the identifier for the neighbor sending the first neighbor discovery reply packet and an identifier of a network interface on which the first neighbor discovery reply packet is received.

8. The computing device of claim 6, further comprising sending one or more packets to each computing device in the computer network with routing information, wherein the routing information specifies a network interface through which the computing device is configured to transmit a network packet destined for another computing device.

9. The computing device of claim 6, wherein the plurality of computing devices are computers that each have multiple network interfaces.

10. The computing device of claim 6, wherein the plurality of computing devices are computer processors that each have multiple network ports.

11. A method for operating a computing device in a computer network that has a plurality of computing devices, comprising:

receiving a first neighbor discovery packet sent by a neighbor on a first network interface;

sending a first neighbor discovery reply packet on the first network interface;

sending a second neighbor discovery packet on a second network interface of the computing device, the second network interface being different from the first network interface;

receiving a second neighbor discovery reply packet responsive to the second neighbor discovery packet;

building a neighbor map for a plurality of neighbor computing devices using the second neighbor discovery reply packet;

receiving a first connection discovery packet on the first network interface;

storing an identifier of the first network interface;

sending a first connection discovery reply packet on the first network interface;

forwarding the first connection discovery packet on the second network interface;

receiving a second connection discovery packet responsive to the first connection discovery packet via the second network interface; and forwarding the second connection discovery packet on the first network interface.

12. The method of claim 11, wherein the second neighbor discovery reply packet includes an identifier for a neighbor sending the second neighbor discovery reply packet, and the neighbor map includes the identifier for the neighbor sending the second neighbor discovery reply packet and an identifier of the second network interface.

13. The method of claim 11, further comprising receiving one or more packets with routing information, wherein the routing information specifies a network interface through which the computing device is configured to transmit a network packet destined for another computing device.

14. The method of claim 11, wherein the computing device is a computer that has multiple network interfaces.

15. The method of claim 11, wherein the computing device is a computer processor that has multiple network ports.

16. A computing device, comprising:

a plurality of network interfaces to be coupled to other computing devices in a computer network;

a processor configured to:

receive a first neighbor discovery packet sent by a neighbor on a first network interface;

send a first neighbor discovery reply packet on the first network interface;

send a second neighbor discovery packet on a second network interface of the computing device, the second network interface being different from the first network interface;

receive a second neighbor discovery reply packet responsive to the second neighbor discovery packet;

build a neighbor map including a plurality of neighbor computing devices using the second neighbor discovery reply packet;

receive a first connection discovery packet on the first network interface;

store an identifier of the first network interface;

send a first connection discovery reply packet on the first network interface;

forward the first connection discovery packet on the second network interface;

receive a second connection discovery packet responsive to the first connection discovery packet via the second network interface; and forward the second connection discovery packet on the first network interface.

17. The computing device of claim 16, wherein the second neighbor discovery reply packet includes an identifier for a neighbor sending the second neighbor discovery reply packet, and the neighbor map includes the identifier for the neighbor sending the second neighbor discovery reply packet and an identifier of the second network interface.

18. The computing device of claim 16, further comprising receiving one or more packets with routing information, wherein the routing information specifies a network interface through which the computing device is configured to transmit a network packet destined for another computing device.

19. The computing device of claim 16, wherein the plurality of computing devices are computers that each have multiple network interfaces.

20. The computing device of claim 16, wherein the plurality of computing devices are computer processors that each have multiple network ports.

* * * * *